United States Patent
Kawasaki et al.

(10) Patent No.: US 7,179,566 B2
(45) Date of Patent: Feb. 20, 2007

(54) POSITIVE ELECTRODE ACTIVE MATERIAL FOR SECONDARY CELL, POSITIVE ELECTRODE FOR SECONDARY CELL USING SAME, AND SECONDARY CELL

(75) Inventors: Daisuke Kawasaki, Tokyo (JP); Takehiro Noguchi, Tokyo (JP); Tatsuji Numata, Tokyo (JP)

(73) Assignee: NEC Corporation, Tokyo (JP)

( * ) Notice: Subject to any disclaimer, the term of this patent is extended or adjusted under 35 U.S.C. 154(b) by 38 days.

(21) Appl. No.: 10/486,150

(22) PCT Filed: Mar. 7, 2003

(86) PCT No.: PCT/JP03/02700

§ 371 (c)(1),
(2), (4) Date: Feb. 6, 2004

(87) PCT Pub. No.: WO03/077334

PCT Pub. Date: Sep. 18, 2003

(65) Prior Publication Data

US 2004/0185345 A1 Sep. 23, 2004

(30) Foreign Application Priority Data

Mar. 8, 2002 (JP) ............................. 2002-064428

(51) Int. Cl.
*H01M 4/58* (2006.01)
*H01M 4/50* (2006.01)
*H01M 4/52* (2006.01)

(52) U.S. Cl. .............. 429/231.95; 429/224; 429/218.1; 429/231.9; 429/231.1; 429/223; 429/221; 429/220; 429/231.6; 429/231.5; 423/463; 423/465

(58) Field of Classification Search .......... 429/231.95, 429/224, 218.1, 231.9, 231.1, 223, 221, 220, 429/231.6
See application file for complete search history.

(56) References Cited

U.S. PATENT DOCUMENTS 5,677,087 A 10/1997 Amine et al.

FOREIGN PATENT DOCUMENTS

EP 0 885 845 A1 12/1998
EP 0885845 A1 * 12/1998

(Continued)

*Primary Examiner*—Patrick Joseph Ryan
*Assistant Examiner*—Angela J. Martin
(74) *Attorney, Agent, or Firm*—McGinn IP Law Group, PLLC

(57) ABSTRACT

A cathode active material for a secondary battery including a lithium-manganese composite oxide having a spinel structure and represented by the following general formula (I), $Li_a(M_xMn_{2-x-y-z}Y_yA_z)(O_{4-w}Z_w)$ (I), wherein $0.5 \leq x \leq 1.2$, $0 \leq y$, $0 \leq z$, $x+y+z<2$, $0 \leq a \leq 1.2$ and $0 \leq w \leq 1$; M contains at least Co and may further contains at least one element selected from the group consisting of Ni, Fe, Cr and Cu; Y is at least one element selected lo from the group consisting of Li, Be, B, Na, Mg, Al, K and Ca; A is at least one of Ti and Si; and Z is at least one of F and Cl. When the cathode active material for the secondary battery is used as the cathode for the a secondary battery, a higher operating can be realized while suppressing the reliability reduction such as the capacity decrease after the cycles and the deterioration of the crystalline structure at a higher temperature.

15 Claims, 1 Drawing Sheet

FOREIGN PATENT DOCUMENTS

| | | |
|---|---|---|
| EP | 1 035 075 A1 | 9/2000 |
| JP | 2000-323140 | * 11/2000 |
| JP | 2001-319653 | * 11/2001 |
| JP | 2001-357851 | 12/2001 |
| JP | 2002-203606 | 7/2002 |
| JP | 2003-81637 | 3/2003 |

* cited by examiner

POSITIVE ELECTRODE ACTIVE MATERIAL FOR SECONDARY CELL, POSITIVE ELECTRODE FOR SECONDARY CELL USING SAME, AND SECONDARY CELL

TECHNICAL FIELD

The present invention relates to a cathode active material with 5V-level potential containing lithium-manganese composite oxide with a spinel structure having the larger discharge capacity, and a cathode for a secondary battery using the same, and a secondary battery using the same.

BACKGROUND ART

Lithium ion secondary batteries are widely utilized in uses such as portable electronic devices and personal computers. In these uses, the battery is conventionally required to have the functions such as compactness and lightness. On the other hand, the increase of the energy density of the battery has been the important technical problem to be solved.

Several methods have been developed for increasing the energy density of the battery among which the increase of the operating voltage of the battery is effective. In the conventional lithium ion secondary battery in which lithium cobaltate and lithium manganate are used as a cathode active material, each of the operating voltages is a 4V-level (average operating voltage=3.6 to 3.8V: vs. lithium potential). This is because the oxidation-reduction reaction of the Co ion or the Mn ion ($Co^{3+} \Leftrightarrow Co^{4+}$ or $Mn^{3+} \Leftrightarrow Mn^{4+}$) defines the developing voltage. On the other hand, a 5V-level operating voltage is known to be realized to use, as an active material, a spinel compound prepared by replacing the Mn of the lithium manganate with Ni or Co. For example, as described in Electrochem. Solid State Lett. 1, No.5, 212 (1998), the use of a spinel compound such as $LiCoMnO_4$ is known to generate a potential plateau in a region of 4.5V or more. In the spinel compound, the Mn has the valency of 4, and the operating voltage thereof is defined by the oxidation-reduction of $Co^{3+} \Leftrightarrow Co^{4+}$ in place of $Mn^{3+} \Leftrightarrow Mn^{4+}$.

It is difficult under the present circumstances to make the energy density of the spinel compound such as $LiCoMnO_4$ significantly larger than that of $LiCoO_2$. The higher capacities and the higher energy densities are required for responding to the expectation for secondary batteries from the various technical fields which will hereafter have the explosive demand, especially from the car industry.

In the spinel compound such as $LiCoMnO_4$, the capacity decrease and crystalline deterioration at a higher temperature may take place, and the improvement with respect thereto is expected.

A method of replacing manganese and oxygen with other elements has been frequently employed for preparing the conventional 4V-level cathode active material. For example, JP-A-11(1999)-312522 and JP-A-2001-48547 disclose, for the purpose of improving the cycle performance and the storage stability at a higher temperature, the introduction of a metal such as boron together with the replacement of part of manganese of lithium manganate with cobalt. However, such an element replacement is based on the 4V-level active material composition. JP-A-2001-48547 discloses the replacement of part of Mn with another element for the purpose of improving the gradual decrease of a discharging capacity which is induced by crystalline distortion in the lithium manganate during the repetition of the uses. However, the publication describes that an amount of the replacement must be kept on or below the specified value for preventing the capacity reduction due to the decrease of trivalent Mn. On the other hand, JP-A-11(1999)-312522, referring to the technique of replacing the part of Mn with the lithium, explicitly describes the purpose of suppressing the decrease of the trivalent Mn to prevent the capacity reduction by replacing part of the above lithium with another bivalent or trivalent metal As described, the replacement of Mn of the conventional 4-V level cathode active material is based on the assumption that the valency of Mn in the active material is maintained lower for securing the capacity, and the valency of Mn is defined to be 3.635 or less in JP-A-11(1999)-312522. Since the operating voltage of the active material disclosed in the above publication is defined by the valency change of the manganese, a specified amount of the trivalent manganese is required to exist in the active material, and the composition ratio of the cobalt in the active material was generally 0.1 or less.

DISCLOSURE OF THE INVENTION

In view of these circumstances, an object of the present invention is to provide a cathode active material for a lithium ion secondary battery which realizes a higher operating voltage while suppressing the reduction of reliability such as capacity decrease after cycles and deterioration of a crystalline structure at a higher temperature; a cathode for the secondary battery and the secondary battery.

In accordance with the present invention, the cathode active material for the secondary battery including a lithium-manganese composite oxide having a spinel structure and represented by the following general formula (I) is provided, $$Li_a(Mn_x Mn_{2-x-y-z} Y_y A_z)(O_{4-w} Z_w) \quad (I)$$ 

wherein $0.5 \leq x \leq 1.2$, $0 \leq y$, $0 \leq z$, $x+y+z<2$, $0 \leq a \leq 1.2$ and $0 \leq w \leq 1$; M contains at least Co and may further contains at least one element selected from the group consisting of Ni, Fe, Cr and Cu; Y is at least one element selected from the group consisting of Li, Be, B, Na, Mg, Al, K and Ca; A is at least one of Ti and Si; and Z is at least one of F and Cl.

The cathode active material of the present invention can realize the operating voltage of 4.5V or more because a composition ratio of "M" (hereinafter also referred to as "cobalt or the like") is between 0.5 and 1.2 both inclusive. This is because almost all the $Mn^{3+}$ in the lithium-manganese composite oxide having the spinel structure disappears by adjusting the composition ratio of the cobalt or the like to be 0.5 or more, and the operating voltage is defined not by Mn but by Co or the like. Since the operating voltage is rather reduced when the composition ratio of the cobalt or the like is too high, the composition ratio of the cobalt or the like is preferably 1.2 or less.

In the present invention, almost all the $Mn^{3+}$ disappears by adjusting the composition ratio of the cobalt or the like to be 0.5 or more thereby elevating the cycle performance of the battery at a higher temperature. In the lithium-manganese composite oxide, the remaining $Mn^{3+}$ in the spinel causes a disproportionation reaction identified by the below equation by means of a free acid (HF) in electrolyte.

$2\ Mn^{3+} \rightarrow Mn^{2+} + Mn^{4+}$ 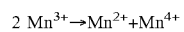

The $Mn^{2+}$ ion generated thereby dissolves into the electrolyte. The $Mn^{2+}$ ion is precipitated on, for example, the surfaces of the separator of the battery or of the carbon anode, thereby suppressing a charge-discharge reaction. Such a phenomenon can be prevented in the present invention because the composition ratio of the cobalt or the like is maintained to be 0.5 so that almost all the $Mn^{3+}$ disappears. As a result, the excellent cycle performance can be realized.

As described, the present invention implements the realization of the higher energy density by improving the cycle performance at the higher temperature while securing the 5V-level operating voltage by adjusting the composition ratio of the cobalt or the like between 0.5 and 1.2 both inclusive.

In the above cathode active material for the secondary battery, "y" may satisfy y=0 in the general formula (I) or the cathode active material may contain no "Y". However, "y" may satisfy 0<y or the cathode active material may contain "A".

In the present invention, part of the manganese is replaced is with a metal lighter than the manganese to increase the energy density. In the general formula (I), "Y" is the metal which replaces the manganese. The "Y" having a valency from 1 to 3 is selected from metals lighter than the manganese. Specifically, at least one metal selected from the group consisting of the group consisting of Li, Be, B, Na, Mg, Al, K and Ca is used. Such the selection of the replacing metal prevents the change of the valency of the "Mn" to realize the higher operating voltage, implements the lighter-weight electrode and increases the battery capacity per weight.

In the present invention, "M" in the above the general formula (I) of the cathode active material for the secondary battery is preferably Co.

In the above cathode active material for the secondary battery, "z" may satisfy z=0 in the general formula (I) or the cathode active material may contain no "A" which indicates Ti and/or Si. However, "z" may satisfy 0<z or the cathode active material may contain Ti and/or Si.

Both of Ti and Si are the metals lighter than Mn, and are excellent in chemical stabilities. The composition replaced with these metals implements the further lightness and the increase of the energy density per weight.

Further, in the above cathode active material for the secondary battery, "w" may satisfy w=0 in the general formula (I) or the cathode active material may contain no "Z" which indicates is F and/or Cl. However, "w" may satisfy 0<w≦1 or the cathode active material may contain F and/or Cl.

In the active material having such the composition, the following new behaviors and effects can be obtained in addition to the prominently higher energy density by replacing oxygen in addition to the manganese. When part of the manganese is replaced with a metal "Y" having a valency from 1 to 3, $Co^{3+}$ is likely to be converted into $Co^{4+}$. This is because the valency of the cobalt inclines to increase for maintaining the whole sum of the valencies in the entire compound to be zero when Mn having the valency of 4 is replaced with the metal Y having the valency of 3 or less. When the $Co^{3+}$ is converted into $Co^{4+}$, the capacity is reduced after the components contributable to the charging and the discharging in the active material is decreased. In the present invention, the part of the oxygen is replaced with "Z" for suppressing the above capacity reduction. Since the valency of the oxygen is −2 while that of "Z" is −1, the total sum of the electric charge of the entire compound is maintained to be zero in accordance with the above replacement without the increase of the valency of the cobalt when Mn is replaced with the metal having the valency of 3 or less. As described, the present invention efficiently suppresses the capacity reduction of the battery originating from the valency change of the Co generated in the replacement of the Mn with the other lighter metal by means of the function of the element "Z" which replaces the oxygen When, accordingly, the Mn is replaced with the Y, the oxygen is replaced with the Z or y>0 and w>0 are preferable.

In the present invention, "x" desirably satisfies 0.8≦x≦1.2 in the general formula (I) of the cathode active material for the secondary battery.

The operating voltage around 5V is stably realized by adjusting the composition ratio of the cobalt or the like between 0.8 and 1.2 both inclusive.

In the present invention, the "Y" in the cathode active material for the secondary battery is desirably at least one metal selected from the group consisting of Li, Mg and Al.

Thereby, the light-weight electrode can be implemented while realizing the higher operating voltage, and the battery capacity per weight can be improved.

In the present invention, the average discharge voltage of the cathode active material for the secondary battery with respect to the lithium reference voltage is desirably 4.5V or more.

Further, in the present invention, a theoretical valency value of the Mn in the lithium-manganese composite oxide having the spinel structure of the cathode active material for the secondary battery is desirably 3.7 or more. The theoretical valency value of the Mn refers to a calculated value based on the valencies of the respective elements other than the Mn and the composition ratio.

In this manner, the operating voltage can be stably maintained higher.

As described above, the replacement of the manganese or the oxygen with other elements has been employed in the conventional 4V-level cathode active material. However, an object and a configuration thereof are different from those of the present invention.

In contrast to the conventional technique, the present invention implements the higher energy density and the improvement of the cycle performance at the higher temperature in addition to the realization of the 5V-level higher operating voltage by means of diminishing the trivalent manganese by adjusting the composition ratio of the cobalt or the like to be 0.5 or more. The background of the 4V-level cathode active material is different from that of the present invention, and the present invention solves the technical problem inherent to the active material realizing the higher operating voltage of the 5V-level. Specifically, the higher capacity is implemented by means of increasing the discharge amount per weight by decreasing the weight which is attained by the partial element replacement of the Mn or the O not contributable to the charging and the discharging of the 5V-level lithium-manganese composite oxide having the spinel structure.

In the present invention, the cathode active material for the secondary battery can be used as a cathode for a secondary battery.

Further, in the present invention, a secondary battery can be provided which includes the above cathode for the secondary battery and an anode disposed opposite to the cathode through intermediary of electrolyte. The secondary battery has the higher energy density per weight and the excellent cycle performance at the higher temperatures.

As described above, the present invention can provide the cathode active material for the lithium ion secondary battery realizing the higher operating voltage while preventing the reduction of the reliability such as the capacity reduction after the cycles and the deterioration of the crystalline structure; the cathode for the secondary battery using the same; and the secondary battery using the same.

The above and other objects, features and advantages of the present invention will be more apparent from the following description.

BEST MODE FOR IMPLEMENTING INVENTION

Figure 1:
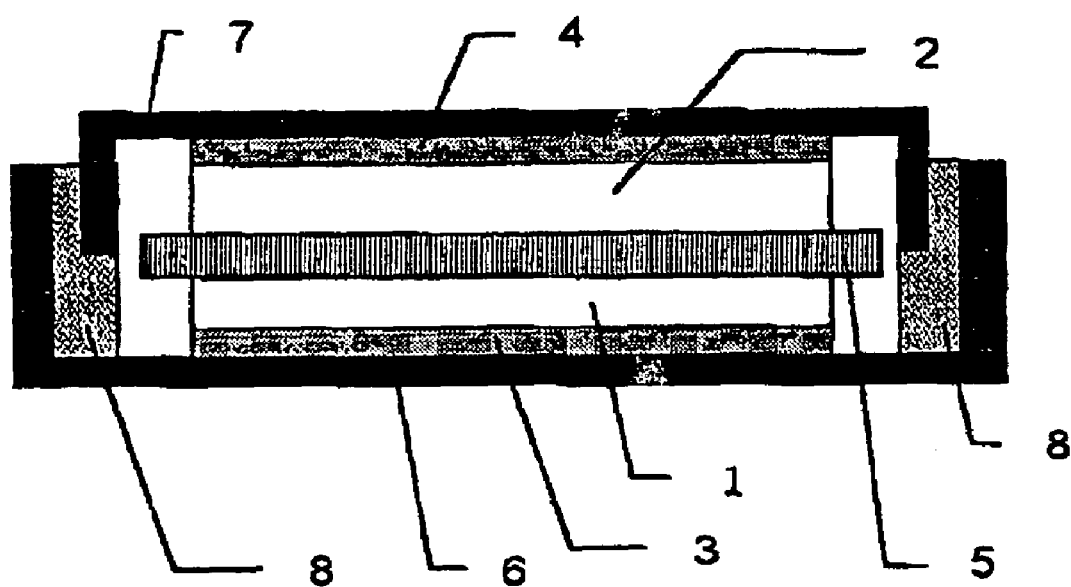
FIG. 1 is a vertical sectional view showing an example of a secondary battery in accordance with the present invention.

While the element "M" in the above general formula (I) contains Co as an essential component in the present invention, the "M" may further contain at least one element selected from the group consisting of Ni, Fe, Cr and Cu. These elements are transition metals capable of taking the both situations in one of which the valency is 3 or less and in the other the valency is lager than 3. The element "M" may be used by itself.

The composition ratio "y" for the "Y" may be zero or more, preferably 0.05 or more, and more preferably 0.1 or more. Under these circumstances, the improvement effect for the energy density appears more remarkably.

The "Y" is a stable element having a valency of 1 to 3, may be lighter than the Mn and specifically includes Li, Be, B, Na, Mg, Al, K and Ca. Among these, at least one element selected from the group consisting of Li, Mg and Al is especially preferable because the energy density per weight can be efficiently increased while suppressing the decrease of the discharging capacity.

In the general formula (I) of the present invention, the "A" may include Ti, and the "A" may include Si.

The theoretical value of the Mn in the lithium-manganese composite oxide having the spinel structure of the present invention is preferably 3.7 or more and more preferably 3.8 or more. Under these circumstances, the operating voltage around 5V with respect to the Li metal can be stably maintained. Further, the elution of the Mn into the electrolyte can be more efficiently prevented to suppress the capacity decrease during the repetitive uses. The excellent performances with respect to the is capacity and the cycle performance can be exerted when the composition ratio of the Co is 1.0 or more and the theoretical value of the Mn valency is 3.8 or more.

The realization of the lightweight can be possible by replacing the Mn with the "Y" and further replacing the "O" with F or Cl in the present invention. Since the capacity value is decreased when the Co valency is changed due to the element replacement, the amount of replacing the oxygen with the element "Z" is desirably adjusted not to cause the change of the Co valency. Under the situation in which the Li is inserted into the spinel (discharge situation), the Co is desirably trivalent, and the relation between the amount "w" of replacing the "O" and the amount "y" of replacing the Mn is such that $w=(4-n)y$ is ideally satisfied and $(4-n)y\times0.8<w<(4-n)y\times1.2$ is desirably satisfied wherein "n" refers to a valency of an element replacing the Mn. Since the "Y" is not restricted only to one element, the relation may change depending on the kind of the elements and the amount replacing the "Y". Under the situation in which the above relation is maintained, the amounts of the movable Li are maintained substantially equal before and after the replacement, lo and the decrease of the entire weight is possible so that the higher capacity can be realized while keeping the higher reliability. The investigation showed that the lithium-manganese composite oxide having the spinel structure after the replacement had the capacity of 120 mAh/g or more and the higher reliability. In the 5V-level spinel, the higher capacity can be obtained by replacing the Mn with the element which is lighter than the Mn and has the valency 1 to 3 and replacing the "O" with the "F" or the Cl, and the remarkably excellent performance with respect to the energy density can be obtained because the charging and the discharging can be conducted at a higher voltage of 4.5 V or more with respect to the Li metal.

The lithium ion secondary battery of the present invention includes, as main components, a cathode having the lithium-containing metal composite oxide as a cathode active material, an anode having an anode active material which is capable of inserting and releasing lithium, and further includes a separator between the cathode and the anode for preventing the electrical connection. The cathode and the anode are immersed in lithium-ion conductive electrolyte, and these components are sealed in a battery case. By applying voltages to the cathode and the anode, the lithium ion is released from the cathode active material, and the lithium ion from the cathode active material is inserted into the anode active material, thereby providing a fully charged condition. Then, by electrically contacting the cathode and the anode out of the battery, the lithium ion is released from the anode active material and is inserted into the cathode active material, thereby causing the discharge conversely to the charging.

Then, a method of preparing the cathode active material is will be described. A usable Li raw material for the preparation of the cathode active material includes $Li_2CO_3$, LiOH, $Li_2O$ and $Li_2SO_4$, and among these, $Li_2CO_3$ and LiOH are appropriate. A usable Mn raw material includes various Mn oxides such as electrolytic manganese dioxide (EMD), $Mn_2O_3$, $Mn_3O_4$ and chemical manganese dioxide (CMD); $MnCO_3$ and $MnSO_4$. A usable Co raw material includes CoO, $Co_3O_4$, $CoCl_2$, $Co(OH)_2$, $CoSO_4$, $CoCO_3$ and $Co(NO_3)_2$. A usable raw material for the replacing element includes oxides, carbonates, hydroxides, sulfides and nitrates of the replacing element. The element diffusion of the Co raw material, the Mn raw material and the raw material for the replacing element may hardly take place during sintering so that the Co oxides, the Mn oxides and the oxides of the replacing element may remain in the hetero phase after the sintering of the raw materials. In order to prevent this occurrence, after the Co raw material, the Mn raw material and the raw material for the replacing material are dissolved and mixed in an aqueous solution, the mixture of the Co and the Mn or the CoMn mixture containing the replacing element prepared by precipitating in the form of the hydroxide, the sulfate, carbonate and the nitrate can be obtained and used.

The Co or Mn oxide and the Co—Mn-replacing element mixed oxides prepared by sintering the above mixtures can be also used. When these mixtures are used as the raw materials, the Mn, the Co and the replacing element are well diffused as is their atoms, and the Co and the replacing elements are easily introduced to the crystallographically prescribed 16d site of the spinel structure.

As a "F" raw material for the cathode active material, a fluoride with the replacing metal element such as LiF is used.

These raw materials are weighed and mixed such that the target metal composition ratio is obtained. The mixing is conducted by using a ball mill or a jet mill for pulverization. The mixed powder is sintered in air or oxygen at a temperature from 600° C. to 950° C. to provide a cathode active material. While the sintering temperature is desirably high to diffuse the respective elements, the excessively higher sintering temperature generates the oxygen depletion to exert ill-effects on the battery performance. The sintering temperature is preferably about from 700° C. to 850° C.

The specific surface area of the obtained lithium metal composite oxide is desirably 3 $m^2/g$ or less, and preferably 1 $m^2/g$ or less. When the specific surface area is increased, a larger amount of a bonding agent is required and the density of the cathode capacity is disadvantageously lowered.

The obtained cathode active material mixed with a conductivity-providing agent is applied and formed on a current collector by using a bonding agent. Examples of the conductivity-providing agent include a carbon material, a metallic material such as Al, and powders of a conductive oxide. Poly-fluorinated vinylidene is used as the bonding agent. A metal thin-film having Al as a main component is used as the current collector.

A preferable amount of the conductivity-providing agent is about 1 to 10% in weight, and an amount of the bonding agent is also about 1 to 10% in weight. This is because the capacity per weight is increased with the increase of the ratio of the active material weight. When the ratios of the conductivity-providing agent and the bonding agent are excessively small, problems arise such that the conductivity cannot be retained and the electrode is peeled off.

The electrolyte is used singly or in combination of two or more compounds including cyclic carbonates such as propylene carbonate (PC), ethylene carbonate (EC), butylene carbonate (BC) and vinylene carbonate (VC); linear carbonates such as dimethyl carbonate (DMC), diethyl carbonate (DEC), ethyl methyl carbonate (EMC) and dipropyl carbonate (DPC); aliphatic carbonic acid esters such as methyl formate, methyl acetate and ethyl propionate; γ-lactones such as γ-butyrolactone; linear ethers such as 1,2-ethoxyethane (DEE) and ethoxymethoxyethane (EME); cyclic ethers such as tetrahydrofuran and 2-methyl tetrahydrofuran; and an aprotic organic solvent such as dimethylsulfoxide, 1,3-dioxolane, formamide, acetamide, dimethylformamide, dioxolane, acetonitril, propylnitril, nitromethane, ethylmonoglyme, triesterphosphate, trimethoxymethane, dioxolane derivatives, sulphorane, methylsulphorane, 1,3-dimethyl-2-imidazolidinone, 3-methyl-2-oxanzolidinone, propylene carbonate derivatives, tetrahydrofuran derivatives, ethylether, 1,3-propane sultone, anisole and N-methylpyrrolidone and fluorinated carbonic acid esters. Among these, propylene carbonate, ethylene carbonate, γ-butyrolactone, dimethyl carbonate, diethyl carbonate and methylethyl carbonate are preferably used singly or in combination of two or more compounds.

The lithium salt is dissolved in these organic solvents. The lithium salt includes $LiPF_6$, $LiAsF_6$, $LiAlCl_4$, $LiClO_4$, $LiBF_4$, $LiSbF_6$, $LiCF_3SO_3$, $Li_4F_9CO_3$, $LiC(CF_3SO_2)_2$, $LiN(CF_3SO_2)_2$, $LiN(C_2F_5SO_2)_2$, $LiB_{10}Cl_{10}$, lithium-lower aliphatic carboxylate, lithium chloroborane, lithium chloroborane, lithium tetraphenylborate, LiBr, LiI, LiSCN, LiCl and imides. Polymer electrolyte can be used in place of the electrolyte. The electrolyte concentration is, for example, 0.5 mol/l to 1.5 mol/l. The higher concentration increases the density and the viscosity. The lower concentration may reduce the electric conductivity.

A carbon material, the Li metal, Si, Sn, Al, SiO and SnO can be used singly or in combination of two or more, as the material for inserting and releasing the lithium acting as the anode active material.

The anode active material is formed on a current collector by using the conductivity-providing agent and the bonding agent. Examples of the conductivity-providing agent include a carbon material and powders of a conductive oxide. Poly-fluorinated vinylidene is used as the bonding agent. A metal thin-film having Al or Cu as a main component is used as the current collector.

The lithium secondary battery of the present invention can be fabricated as follows After the cathode and the anode are stacked sandwiching separators and are wound depending on necessity, the stacked or wound structure is accommodated in a metal can or sealed in a stacked flexible film made of synthetic resin and metal foil.

EXAMPLE 1

A configuration of a coin cell in accordance with an Example of a battery is shown in FIG. 1. The battery shape of the present invention is not restricted so that a cathode and an anode opposing to each other and sandwiching electrolyte may have a wound shape and a stacked shape or the like. The cell includes the coin cell, a laminated pack, a rectangular cell and a cylindrical cell.

As Examples 1 to 5, specimens No.2 to 6 in Table 1 as shown in below were prepared by using the following procedures and evaluated. As Comparative Example 1, a specimen No.1 in Table 1 or $Li(Co_{0.3}Mn_{1.6}Li_{0.1})(O_{3.7}F_{0.3})$ was prepared.

$Li(Co_{0.8}Mn_{1.1}Li_{0.1})(O_{3.7}F_{0.3})$,
$Li(Co_{1.0}Mn_{0.91}Li_{0.1})(O_{3.7}F_{0.3})$,
$Li(Co_{1.0}Mn_{0.8}Li_{0.1}Ti_{0.1})(O_{3.7}F_{0.3})$,
$Li(Co_{1.0}Mn_{0.9}Al_{0.1})(O_{3.7}F_{0.3})$,
$Li(Co_{1.0}Mn_{0.9}Mg_{0.1})(O_{3.7}F_{0.3})$,

The theoretical values of the atomic valences of the Mn in the specimens No.1 to 6 are as follows.

| Specimen 1 (Comparative Example 1): | 3.56 |
| Specimen 2 (Example 1): | 3.82 |
| Specimen 3 (Example 2): | 4.00 |
| Specimen 4 (Example 3): | 4.00 |
| Specimen 5 (Example 4): | 3.78 |
| Specimen 6 (Example 5): | 3.89 |

The raw materials including $MnO_2$, CoO, $Li_2CO_3$, MgO, $Al_2O_3$ and LiF were weighed and mixed for pulverization such that the target metal composition ratios were obtained. The powders after raw material mixing were sintered at 750° C. for 8 hours. All the crystalline structures were confirmed to have spinal structures of substantially a single phase.

The prepared cathode active material, carbon acting as the conductivity-providing agent and metal nitride were mixed and dispersed in a solution prepared by dissolving poly-fluorinated vinylidene (PVDF) into N-methyl-2-pyrrolidone, thereby forming a slurry. The weight ratio among the cathode active material, the conductivity-providing agent and the bonding agent was 88/6/6. The slurry was applied on a current collector made of Al. Thereafter, it was dried in vacuum for 12 hours to provide an is electrode material. After the electrode material was cut out as a circle having a diameter of 12 mm, it was molded under pressure at $3t/cm^2$ to provide a cathode current collector 3 and a cathode active material layer 1.

On the other hand, a Li metal disc acting as an anode active material layer 4 was disposed on an anode current collector 4 made of Al to provide an anode. A PP film was used as a separator, and the cathode and the anode were disposed opposing to each other. As shown in FIG. 1, after this was covered with a cathode external can 6 and an anode external can 7, and electrolyte was filled therein, the interior was sealed with an insulation packing 8. The electrolyte was prepared by dissolving $LiPF_4$ into a solvent of EC/DEC=3/7 (% in volume) at a concentration of 1 mol/l.

The charge-discharge performances of the batteries thus fabricated were evaluated. During the evaluation, the charging was conducted at a charging rate of 0.1 C until 5.3 V, and the discharging was conducted at a charging rate of 0.1 C until 3 V. The charge-discharge cycle performances of these batteries were evaluated in which the charging rate was 1 C, the uppermost voltage was 5.3V and the lowermost voltage was 2.5 to 3V.

As apparent from the comparison between the specimen 2 (Example 1) and the specimen 1 (Comparative Example), the average operating voltage (average charging voltage) of 4.5 V was attained by making the composition ratio of the Co to be 0.5 or more. In the specimen 3 in which the composition ratio of the Co is 1,0, the average operating voltage and the capacity are further improved.

In the specimen 4 (Example 3) in which Li was added and Ti was contained for a purpose of attaining a lightweight active material, the cycle performance was improved compared with the specimen 3 (Example 2) containing no Ti. In the specimens 5 (Example 4) and the specimens 6 (Example 5) in which Mn was replaced with Al or Mg for a purpose of attaining a lightweight active material, the cycle performances substantially the same as that of the specimens 3 (Example 2) of the Li replacement were obtained.

TABLE 1

| Specimen | Composition | Capacity (mAh/g) | Average Operating Voltage (V) | Capacity-Maintaining Rate After 10 Cycles (%) |
| --- | --- | --- | --- | --- |
| Specimen 1 | $Li(Co_{0.3}Mn_{1.6}Li_{0.1})(O_{3.7}F_{0.3})$ | 131 | 4.2 | * |
| Specimen 2 | $Li(Co_{0.8}Mn_{1.1}Li_{0.1})(O_{3.7}F_{0.3})$ | 116 | 4.5 | 61 |
| Specimen 3 | $Li(Co_{1.0}Mn_{0.9}Li_{0.1})(O_{3.7}F_{0.3})$ | 132 | 4.8 | 84 |
| Specimen 4 | $Li(Co_{1.0}Mn_{0.8}Li_{0.1}Ti_{0.1})(O_{3.7}F_{0.3})$ | 134 | 4.9 | 95 |
| Specimen 5 | $Li(Co_{1.0}Mn_{0.9}Al_{0.1})(O_{3.7}F_{0.3})$ | 131 | 4.8 | 79 |
| Specimen 6 | $Li(Co_{1.0}Mn_{0.9}Mg_{0.1})(O_{3.7}F_{0.3})$ | 129 | 4.7 | 77 |

Since the above embodiments are described only for examples, the present invention is not limited to the above embodiments and various modifications or alternations can be easily made therefrom by those skilled in the art without departing from the scope of the present invention.

The invention claimed is:

1. A cathode active material for a secondary battery comprising a lithium-manganese composite oxide having a spinel structure and represented by the following general formula (I), $$Li_a(M_xMn_{2-x-y-z}Y_yA_z)(O_{4-w}Z_w) \quad (I)$$

wherein $0.5 \leq x \leq 1.2$, $0<y, 0<z, x+y+z<2$, $0<a \leq 1.2$, and $0<w \leq 1$, wherein M comprises at least one of Co, Ni, Fe, Cr and Cu, wherein Y comprises at least one element selected from the group consisting of Li, Be, B, Na, Mg, Al, K and Ca, wherein A comprises at least one of Ti and Si, wherein Z comprises at least one of F and Cl, and wherein an average discharge voltage with respect to a lithium standard potential is 4.5V or more.

2. The cathode active material for the secondary battery as claimed in claim 1, wherein "M" in the general formula (I) comprises Co.

3. The cathode active material for the secondary battery as claimed in claim 1, wherein "x" in the general formula (I) satisfies $0.8 \leq x \leq 1.2$.

4. The cathode active material for the secondary battery as claimed in claim 1, wherein "Y" in the general formula comprises at least one element selected from the group consisting of Li, Mg and Al.

5. The cathode active material for the secondary battery as claimed in claim 1, wherein a theoretical value of valency of the Mn in the spinel lithium-manganese composite oxide is 3.7 or more.

6. A cathode for a secondary battery comprising the cathode active material for the secondary battery as claimed in claim 1.

7. A secondary battery comprising the cathode for the secondary battery as claimed in claim 6 and an anode disposed opposite to the cathode through an intermediary of electrolyte.

8. The cathode active material for the secondary battery as claimed in claim 1, wherein an average discharge voltage with respect to a lithium standard potential is 5.0 V or more.

9. The cathode active material for the secondary battery as claimed in claim 1, wherein "y" in general formula (I) satisfies 0.0 5<y.

10. The cathode active material for the secondary battery as claimed in claim 1, wherein "y" in general formula (I) satisfies 0.1<y.

11. The cathode active material for the secondary battery as claimed in claim 1, wherein a theoretical value of valency of the Mn in the spinel lithium-manganese composite oxide is 3.8 or more.

12. The cathode active material for the secondary battery as claimed in claim 1, wherein "x" in the general formula (I) satisfies $1.0 \leq x \leq 1.2$.

13. The cathode active material for the secondary battery as claimed in claim 1, wherein said composite oxide comprises a capacity of 120 mAh/g.

14. A cathode active material for a secondary battery comprising a lithium-manganese composite oxide having a spinel structure and represented by the following general formula (I), $$Li_a(M_xMn_{2-x-y-z}Y_yA_z)(O_{4-w}Z_w) \quad (I)$$

wherein $0.5 \leq x \leq 1.2$, $0<y$, $0<z$, $x+y+z<2$, $0<a \leq 1.2$, and $0<w \leq 1$, wherein M comprises a transition metal, wherein Y comprises an element lighter than Mn,
wherein A comprises at least one of Ti and Si,
wherein Z comprises at least one of F and Cl, and
wherein an average discharge voltage with respect to a lithium standard potential is 4.5 V or more.

15. A secondary battery comprising a cathode for a secondary battery, said cathode comprising a lithium-manganese composite oxide having a spinel structure and represented by the following general formula (I), $$Li_a(M_xMn_{2-x-y-z}Y_yA_z)(O_{4-w}Z_w) \quad (I)$$

wherein $0.5 \leq x \leq 1.2$, $0<y, 0<z, x+y+z+<2$, $0<a \leq 1.2$, and $0<w \leq 1$,
wherein M comprises a transition metal,
wherein Y comprises an element lighter than Mn,
wherein A comprises at least one of Ti and Si, and
wherein Z comprises at least one of F and Cl, and
wherein an average discharge voltage with respect to a lithium standard potential is 4.5 V or more.

* * * * *